United States Patent [19]
Markham

[11] Patent Number: 5,640,931
[45] Date of Patent: Jun. 24, 1997

[54] PET TOY PRODUCT WITH ACTIVATABLE SCENT AND METHOD

[75] Inventor: Joseph P. Markham, Arvada, Colo.

[73] Assignee: Bounce, Inc., Lakewood, Colo.

[21] Appl. No.: 448,645

[22] Filed: May 24, 1995

[51] Int. Cl.$^6$ .................................................. A01K 29/00
[52] U.S. Cl. .................................................. 119/711
[58] Field of Search ........................... 446/208; 434/428; 119/702, 707, 708, 709, 710, 711

[56] References Cited

U.S. PATENT DOCUMENTS

| | | | |
|---|---|---|---|
| Re. 32,713 | 7/1988 | Woo | 428/240 |
| 1,006,182 | 10/1911 | Cousin | 119/711 |
| 3,655,129 | 4/1972 | Seiner | 239/60 |
| 3,871,334 | 3/1975 | Axelrod | 119/29.5 |
| 4,243,224 | 1/1981 | Spector | 273/157 R |
| 4,254,179 | 3/1981 | Carson, III et al. | 428/311 |
| 4,487,585 | 12/1984 | Goldwasser | 434/259 |
| 4,513,014 | 4/1985 | Edwards | 426/132 |
| 4,674,444 | 6/1987 | Axelrod | 119/29.5 |
| 4,687,203 | 8/1987 | Spector | 273/157 R |
| 4,817,860 | 4/1989 | Shapiro | 229/80 |
| 4,898,633 | 2/1990 | Doree et al. | 156/145 |
| 4,924,811 | 5/1990 | Axelrod | 119/29 |
| 5,018,974 | 5/1991 | Carnahan et al. | 434/98 |
| 5,018,975 | 5/1991 | Carnahan et al. | 434/98 |
| 5,039,243 | 8/1991 | O'Brien | 401/49 |
| 5,114,735 | 5/1992 | Rua, Jr., et al. | 427/7 |
| 5,447,439 | 9/1995 | Nathanson | 434/346 |
| 5,474,805 | 12/1995 | Vaughn | 427/207.1 |

*Primary Examiner*—Thomas Price
*Attorney, Agent, or Firm*—Fields & Johnson, P.C.

[57] ABSTRACT

A pet toy product with activatable scent is provided which includes sheet-like material that has applied to it a scent producing element. The scent is activatable and controllable in terms of intensity and duration. The sheet material may be formed into a desired shape, and a desired image may be applied to the sheet material as well. The pet toy product may be used by itself for stimulation of an animal or may be used in conjunction with a pet toy to enhance its effectiveness upon an animal.

20 Claims, 3 Drawing Sheets

U.S. Patent        Jun. 24, 1997        Sheet 1 of 3        5,640,931
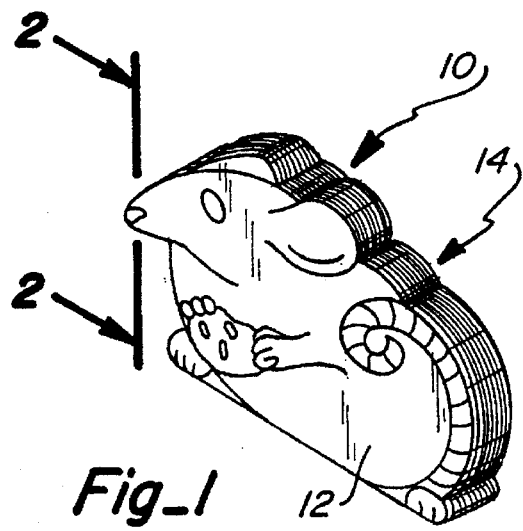
Fig_1
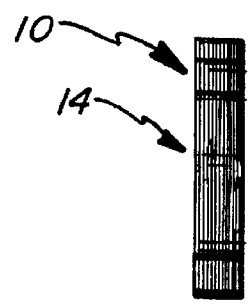
Fig_2
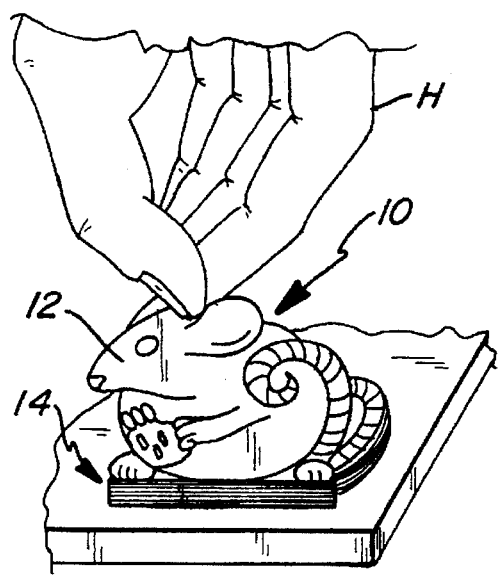
Fig_3B
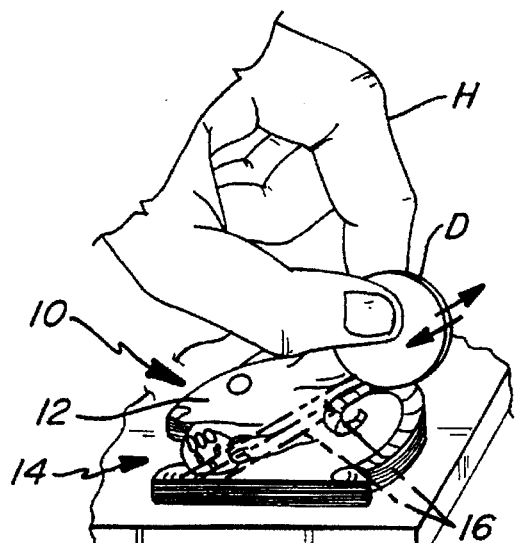
Fig_3A
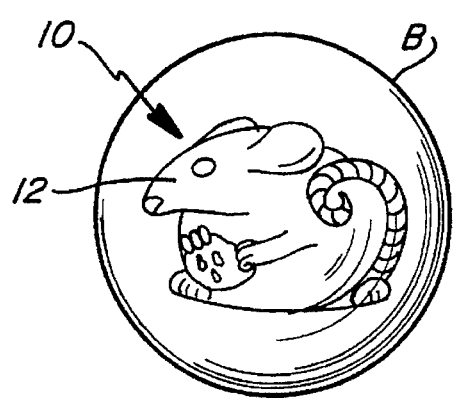
Fig_3C

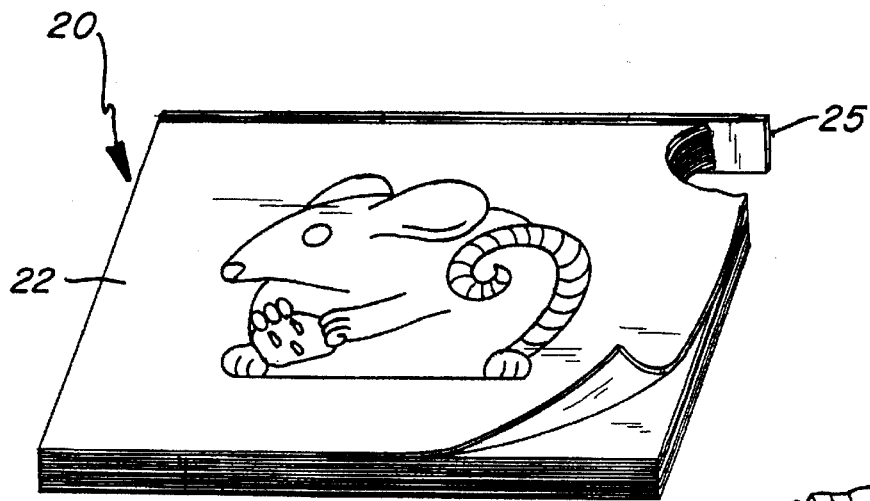
Fig_4
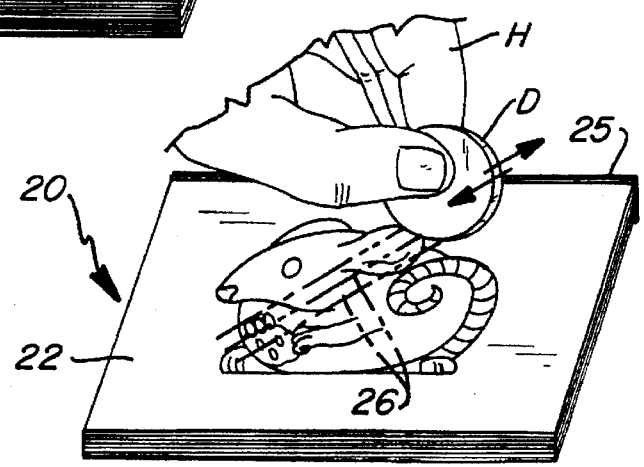
Fig_5A
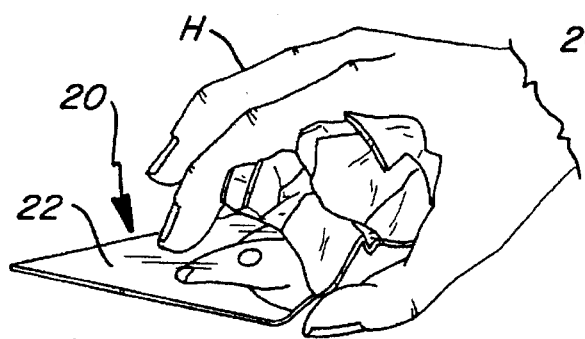
Fig_5B
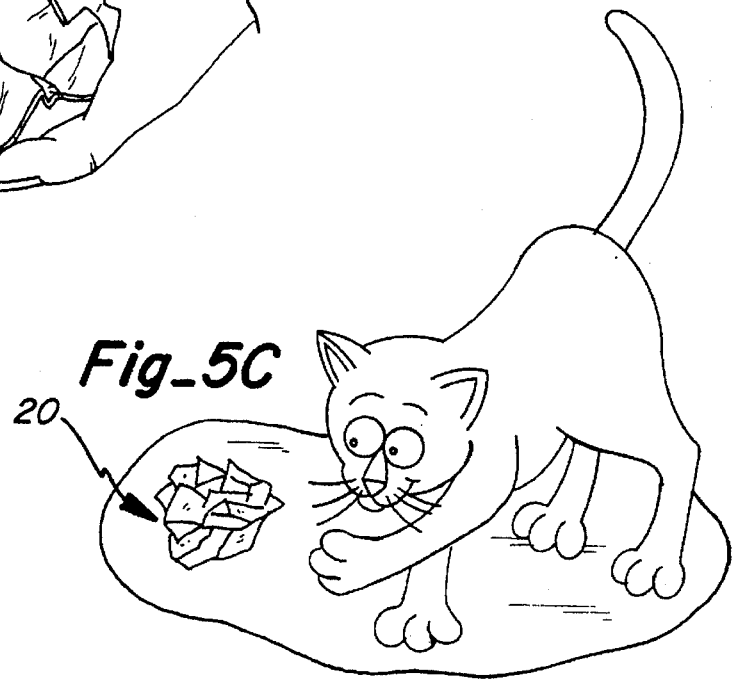
Fig_5C

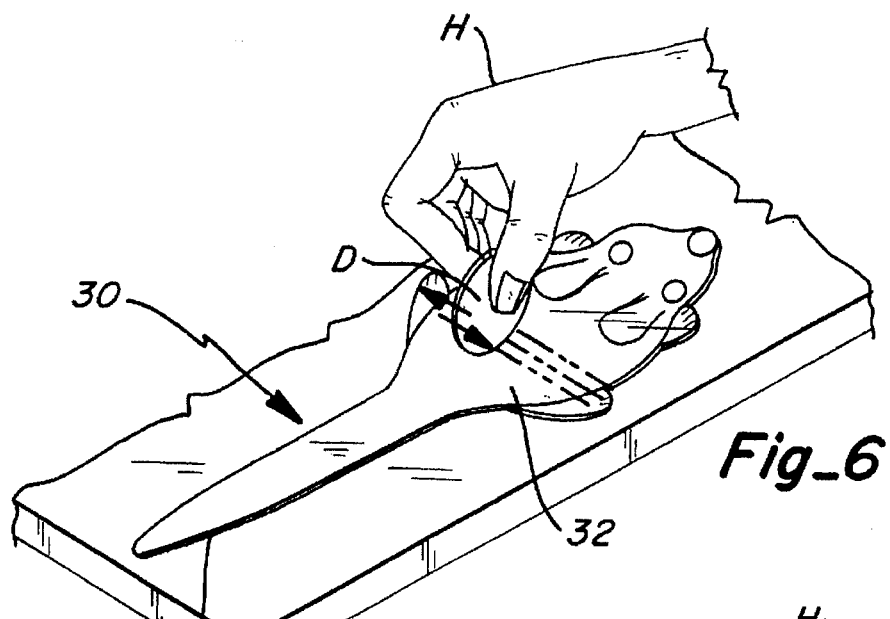
Fig_6
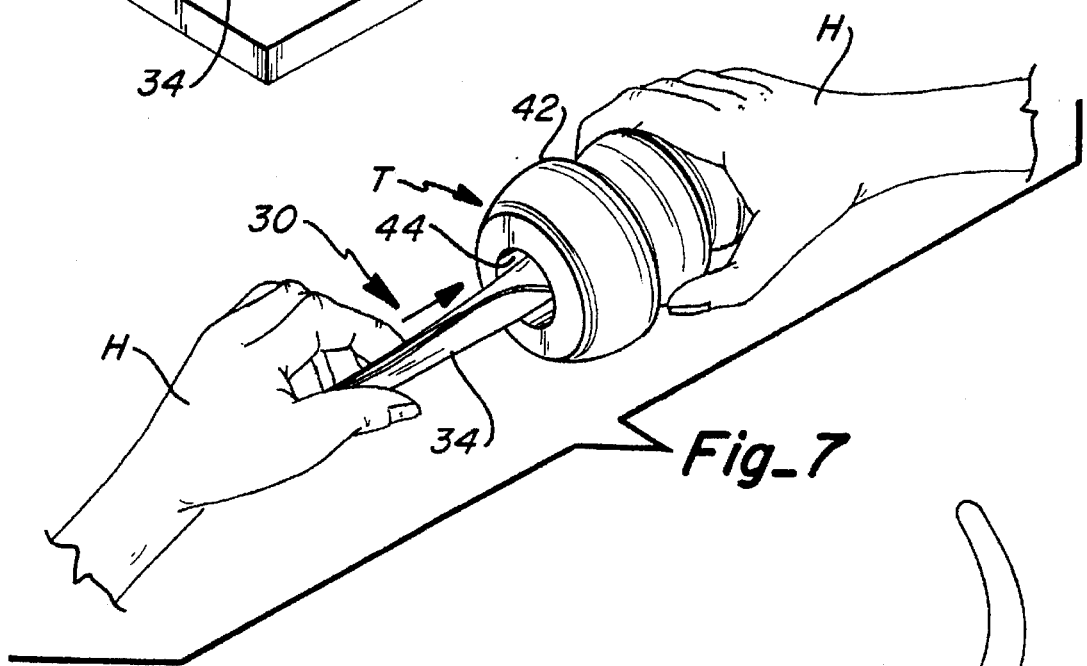
Fig_7
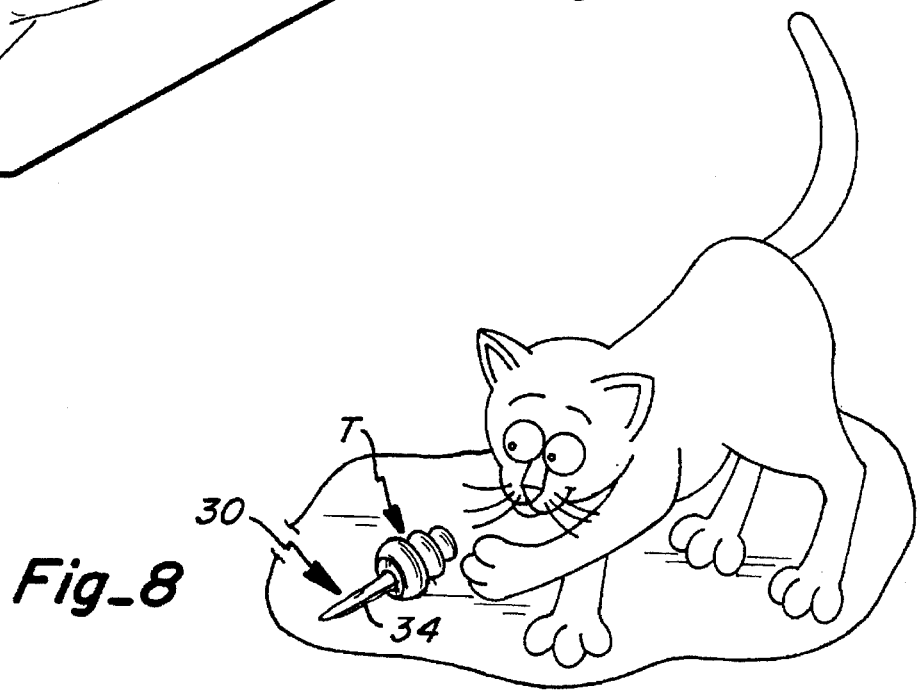
Fig_8

PET TOY PRODUCT WITH ACTIVATABLE SCENT AND METHOD

TECHNICAL FIELD

This invention relates to a pet toy product and, more particularly, to such a pet toy product which includes an activatable scent which stimulates the olfactory sense of an animal.

BACKGROUND ART

The idea of incorporating a material having a particular scent with an object so that the object maintains a desired fragrance is embodied in numerous inventions. One of the more common ways in which to provide a desired fragrance to an object is to apply a thin film of microencapsulated material having a particular scent producing element therein onto the surface of the object. The scent is released by breaking the capsules containing the scent producing element. This concept of microencapsulated scents is commonly referred to as "scratch and sniff" technology. Another manner in which to impart a particular scent onto an object is to simply apply a thin film of odorous material such as an oil onto the surface of the object. A protective coating may then be placed over the oil wherein the scent is activated by scratching the protective layer to expose the thin film.

An example of a device which incorporates "scratch and sniff" technology is U.S. Pat. No. 5,114,735 to Rua. This invention discloses a scratch-off game piece which contains a fragrance which is released during the game play action. The game piece is constructed by application of layers of fragrance-containing encapsulated material and scratch-off material over a support layer of printed sheet material such that when the scratch-off material is removed by the player, the fragrance-containing capsules are ruptured and the fragrance is released.

U.S. Pat. No. 5,018,974 to Carnahan, et al., discloses a coloring book or the like that is provided with an image area that releases an appropriate fragrance upon being colored or painted by the user. Microcapsules that contain fragrance oil for a particular fragrance associated with the image area are deposited on the image area of a substrate sheet. Inert walls of material such as gelatin restrain the fragrance within the microcapsules until activated. The invention enables the release of fragrances in the normal course of coloring an image without requiring an action such as scratching or pulling apart of the substrate sheets in which the image is placed.

Other examples of inventions which utilize a releasable fragrance or scent include U.S. Pat. No. 5,039,243 for fragrance-releasing crayons; U.S. Pat. No. 4,487,585 for educational toys having fragrance association means; U.S. Pat. No. 4,687,203 for a scratch and smell game; U.S. Pat. No. 4,243,224 for a scratch and smell puzzle; and U.S. Pat. No. 4,817,860 for a fragrance-releasing envelope.

Representative of general "scratch and sniff" technology includes U.S. Pat. No. 3,655,129 to Seiner, U.S. Pat. No. 4,254,179 to Carson, III, et al., and U.S. Pat. No. 4,898,633 to Doree, et al.

In terms of pet toys, efforts have been made toward providing pet toys which contain a fragrance or scent which stimulate the olfactory sense of an animal. For example, U.S. Pat. No. 3,871,334 to Axelrod discloses a chewing toy for animals which includes flavor and odor components. These components are impregnated into the nylon substrate of the toy by immersing the toy in an aqueous solution and subjecting the toy to prolonged contact with the solution. The solution is absorbed by the nylon substrate. The flavor and odor components are released when the animal chews on the toy.

Another chew toy having flavor and odor components is disclosed in U.S. Pat. No. 4,513,014 wherein an aromatic extract such as catnip or a meat flavoring is added to and uniformly distributed throughout a polyurethane toy during the initial formulation of the polyurethane.

Other examples of pet toys having a flavor or odor component are U.S. Pat. No. 4,674,444 to Axelrod which teaches a chew toy comprising a nylon piece impregnated with a desirable flavor and scent, and U.S. Pat. No. 4,924,811 to Axelrod which discloses a pet toy comprising an annealed nylon rope impregnated with a flavor and scent that appeals to dogs.

While the foregoing pet toy inventions may be adequate for their intended purposes, one common shortfall with each of these inventions is that activation of the flavor or scent component is dependent upon the action of the animal in engaging the toy. That is, the flavor or scent component is primarily activated only when the animal vigorously chews the toy. While the prior art toys may have some residual amount of scent and flavor, the real value of the fragrance and scent components are only realized when the animal actually chews on the toy. Thus, it is desirable to have a pet toy product wherein the scent component is not dependent upon the action of the animal, and wherein the pet owner may control either the intensity and/or duration of the scent provided to the animal. There is also a need for a pet toy product which may supplement or enhance the effectiveness of an existing pet toy by providing a pet toy product which has an activatable and controllable scent. Furthermore, each of the prior art pet toys utilize a comparatively complex manufacturing means to provide scent or flavor to the pet toy.

As for the foregoing inventions which relate to "scratch and sniff" material and technology, none of these references contemplate the application of "scratch and sniff" technology to pet toy products to enhance the effectiveness of an existing pet toy.

DISCLOSURE OF THE INVENTION

In accordance with this invention, a pet toy product with an activatable and controllable scent is provided. In a first embodiment, the pet toy product comprises a sheet-like material that has applied to it an image like that of an animal. A scent producing element is then applied to the sheet material containing the image. The scent is activatable by the use of an implement which scratches the surface of the coated sheet material. Typically, the scent producing element may include microencapsulated catnip which is released by breaking the capsules with the implement. Another method of applying the scent producing element to the sheet material is simply to cover the sheet material with a scent bearing constituent and then apply a protective coating which may be scratched off.

According to the invention claimed herein, the sheet material may be cut into the shape of the animal which is depicted by the image. A group of sheet material may be stacked much like pieces of paper in a tablet to form a packet of pet toy products. A securing means may be used to hold the sheets together so that a single sheet may be removed from the packet much like a single page from a tablet or "sticky" pad.

In a second embodiment, the invention may be found in the form of a sheet which is cut in a rectangular shape with an image like that of an animal being applied thereon. As with the other embodiment, the scent producing element is then applied to the sheet in the desired manner. In use, the scent producing element may be activated and then the sheet may be crumpled into a wad which can be manipulated by an animal.

In yet another embodiment, the pet toy product may include sheet material which is formed in the shape of an animal such as a mouse having an elongated tail. The pet toy product then may be attached or placed into another pet toy wherein the elongated tail protrudes to also provide visual stimulation to the animal.

Common to each of the embodiments is that the scent producing element applied to the sheet material may be controlled both in terms of producing a particular scent intensity and duration. That is, depending upon the amount of scent producing element activated by the scratching action and the frequency of such scratching action, the scent produced by the pet toy product is selective and controllable by the pet owner. The construction of this invention is extremely simple yet provides both visual and olfactory stimulation to the animal playing with the pet toy product. Additionally, there are virtually a limitless number of shapes and images which may be applied to the sheet material enabling the pet toy product to resemble any desired visual object for stimulation of differing types of animals.

Further advantages of this invention will become apparent from the description, taken in conjunction with the accompanying drawings.

BRIEF DESCRIPTION OF THE DRAWINGS

FIG. 1 is a perspective view of a first embodiment showing a pet toy product constructed in accordance with this invention;

FIG. 2 is a side view of the pet toy product of this invention taken along line 2—2 of FIG. 1;

FIG. 3A is another perspective view of the pet toy product of this invention illustrating activation of the scent producing element by the use of a scratching implement;

FIG. 3B is a perspective view illustrating a single sheet being removed from a packet of pet toy products;

FIG. 3C is a perspective view showing a single sheet of the pet toy product attached to a pet toy ball;

FIG. 4 is a partial cut-away perspective view illustrating a second embodiment of the pet toy product of this invention;

FIG. 5A is a perspective view of the pet toy product in FIG. 5A illustrating activation of the scent producing element;

FIG. 5B illustrates the pet toy product of this invention as shown in FIG. 5A being crumpled into a wadded configuration;

FIG. 5C illustrates a domestic cat batting the wadded pet toy product of FIG. 5B;

FIG. 6 illustrates a third embodiment of the pet toy product of this invention including a sheet shape characterized by an animal with an elongated tail and showing activation of the scent producing element;

FIG. 7 illustrates placement of the third embodiment inside a pet toy;

FIG. 8 illustrates a domestic cat playing with the pet toy product shown in FIG. 6.

BEST MODE FOR CARRYING OUT THE INVENTION

As best seen in FIG. 1, the pet toy product 10 in a first embodiment of this invention comprises a sheet material 12 made of a material such as Du Pont Tyvec® paper or other suitable sheet material that is resistant to tearing and capable of readily accepting print or other visual media. The sheet 12 may be cut and formed into any desirable shape. As shown in FIG. 1, in the first embodiment, the shape is that of a mouse having a curled tail. An image of an animal may be applied on the sheet material 12 corresponding to the particular desired shape. This image may be applied in any number of suitable ways to include printing, staining, embossing or any other suitable printing technique which provides the desired image. On the opposite side of the sheet material having the image, a securing means such as adhesive may be applied thereon so that the pet toy product may be adhered to another object, such as a ball as shown in FIG. 3C. A number of pieces of sheet material 12 may be packaged for sale as a packet or group. This packet or group might resemble a packet 14 of sheets of paper like Post-it Notes® or a common tablet of paper. As shown in FIG. 3B, when one desires to utilize one sheet 12, one would simple lift away the sheet from the packet 14.

Over or in conjunction with the printed image applied to the sheet material 12 is further applied the scent producing element. One common way in which to apply the scent producing element is to provide microencapsulated media which is rolled or pressed onto the image in a thin film. Another method may be to simply coat the sheet material 12 with a liquid solution containing the scent producing element and then apply a sealing or protective coating over the scent producing element. One preferred method of applying the scent producing element to the sheet material 12 is to utilize the method commercialized by Sandy Alexander, Inc. of Clifton, N.J. This scenting technology is marketed under their trademark "Scentific™." Essentially, this method utilizes a press varnish which may be directly applied to printing presses which enables the combination of high quality color printing and scenting within an in-line operation. According to this process, the intensity of the scent can be controlled and the image printed on the sheet material does not have to be distorted or broken up to release the scent. Furthermore, this process allows application in defined spot areas and can allow multiple scents on a single sheet. Finally, according to this process, the scent release is activatable a number of times by the pet owner which enables further control of the intensity and control of the duration of the scent.

In operation, as shown in FIG. 3A, the pet owner would take a device such a coin or other device D with a defined edge and by means of the hand H, scratch the surface of the sheet material 12 with device D to release the scent producing element. When the scent producing element is provided in the form of microencapsulated media, the scratching action ruptures the capsules and allows the scent to be released. If the scent producing element is applied in conjunction with a uniform protective layer, the device D can be used to remove the protective layer and expose the scent producing element. Regardless of the method of applying scented material to the sheet material 12, activation of the scent producing element is primarily controlled by the pet owner who scratches the appropriate amount of the sheet material at the appropriate time interval to achieve the desired intensity and duration of the scent. Typically, the larger the surface of sheet material scratched, the higher the intensity of the scent. Also, as mentioned above, the intensity may be initially controlled by the intensity of the scent used in the in-line operation. Similarly, the greater the frequency the sheet material is scratched, the greater the duration of the scent. As shown in FIG. 3A, scorelines 16 represent the points at which the device D contacts the sheet material 12. Depending upon the type of print that is used for the image, the image may remain unaffected by the contact of the device D against the sheet material 12. Releasable attaching means are provided to keep each piece of sheet material 12 within the uniform packet 14. This means could include any suitable means such as a wax, adhesive or a retaining strip like used on a pad of tablet paper. The desired number of sheets 12 may be removed from the packet 14 and then applied to an object such as a ball B or other objects commonly used as pet toys.

As shown in FIG. 4, in a second embodiment, a pet toy product 20 comprises a sheet material 22 preferably formed in a rectangular shape wherein an image is applied to the central portion thereof. As in the first embodiment, the scent producing element is applied over or in conjunction with the image and, as shown in FIG. 5A, may be selectively released by scratching the sheet material 22 with the device D denoted by scorelines 26. In operation, the sheet material 22 may simply be crumpled into a wad-like configuration which is attractive to an animal such as a cat. The second embodiment may be configured in a packet arrangement 24 wherein a retaining strip 25 is used to hold each piece of sheet material 22.

In yet another embodiment as shown in FIGS. 6-8, a pet toy product 30 may include sheet material 32 which is formed in the shape of an animal such as a mouse having an elongated tail 34. Once the scent producing element has been activated, the pet toy product 30 can be placed inside another pet toy T, such as a Kong® pet toy manufactured by Bounce, Inc. d/b/a The Kong Company of Lakewood, Colo. The addition of the pet toy product 30 to the pet toy T enhances the effectiveness of the existing pet toy T. Furthermore, the addition of the pet toy product 30 can be considered a new pet toy combination. The Kong® pet toy is characterized by a shape having successive stacked layers defining an external side 42, and a hollow interior defining an internal side 44. The Kong® is made of a synthetic rubber which is resilient to the biting action of an animal. Once deformed by the bite of an animal, the Kong® returns to its undeformed shape. Although the Kong® pet toy is shown, it will be understood that the pet toy product of this invention may be used with other common pet toys wherein the pet toy receives the sheet material 32.

The foregoing invention provides a pet toy product which is simple in construction, yet offers controllable and selective stimulus to the olfactory senses of an animal. The pet owner can control both the intensity and the duration of the scent which is released from the toy. The manufacturing process of making the pet toy product can also control the intensity of the scent. The activation of the scent producing element applied to the sheet material is not dependent upon any particular action by the animal, thus, the pet toy product provides the desired stimulation despite the particular disposition of the animal.

This invention has been described in detail with reference to particular embodiments thereof, but it will be understood that various other modifications can be effected within the spirit and scope of this invention.

I claim:

1. A pet toy product comprising:

a sheet material having first and second sides;

a securing material applied to said second side; and said sheet material including a scent producing element applied to said first side thereof that is selectively activatable by scratching said pet toy product.

2. A pet toy product, as claimed in claim 1, further comprising:

an image applied to said first side.

3. A pet toy product, as claimed in claim 1, wherein:

said scent producing element is selectively activatable for producing a scent of desired intensity.

4. A pet toy product, as claimed in claim 1, wherein:

said scent producing element is selectively activatable for producing a scent of desired duration.

5. A pet toy product, as claimed in claim 1, wherein said scent producing element includes:

a plurality of microcapsules having a scent producing constituent disposed therein, said scent producing element being activatable by rupturing said plurality of said microcapsules.

6. A pet toy product, as claimed in claim 1, wherein said scent producing element includes:

a layer of scent emitting solution; and a rupturable membrane covering said layer.

7. A pet toy product, as claimed in claim 1, wherein said pet toy product has the shape of an animal.

8. A pet toy product, as claimed in claim 1, wherein said securing material is an adhesive.

9. A pet toy product packet comprising:

a plurality of pet toy products, as claimed in claim 1, arranged in successive layers; and means for releasably attaching said plurality of pet toy products so that a single pet toy product may be selectively removed from said pet toy packet.

10. A pet toy, as claimed in claim 1, wherein:

said sheet material is a wad-like configuration of sheet material.

11. A method of making a pet toy product comprising the steps of:

providing a scent producing element which stimulates the olfactory sense of an animal;

providing sheet material resistant to tearing, the sheet material having first and second sides;

applying the scent producing element to the first side of the sheet material;

applying a securing material to a second side of the sheet material; and activating the scent producing element to produce a scent of controllable intensity and duration.

12. A method, as claimed in claim 11, further comprising the step of:

applying an image to the first side of the sheet material.

13. A method, as claimed in claim 11, further comprising the step of:

deforming the sheet material into a wad-like configuration.

14. A method, as claimed in claim 11, further comprising the step of:

securing the sheet material via the securing material to another pet toy, such as a ball or the like.

15. A method of making a pet toy product comprising the steps of:

provapiding a scent producing element which stimulates the olfactory senses of an animal;

providing a sheet material resistant to tearing;

applying the scent producing element to the sheet material; and deforming the sheet material into a wad-like configuration.

16. A method, as claimed in claim 15, further comprising the step of:

applying an image to the sheet material.

17. A method of enhancing the effectiveness of a pet toy by providing a pet toy product having an activatable and controllable scent that is pleasing to an animal, said method comprising the steps of:

providing a pet toy;

providing a pet toy product having a scent which stimulates the olfactory sense of the animal;

activating the scent of the pet toy product to a desired intensity level and duration; and securing the pet toy product to the pet toy, wherein at least a portion of the pet toy product is exposed so that the scent may be received by the animal.

18. A method, as claimed in claim 17, wherein said securing step further includes:

placing the pet toy product inside the pet toy.

19. A pet toy for use by an animal, said pet toy comprising:

a receiving piece having a predetermined shape and interior and exterior sides, said receiving piece being resilient to and flexible in response to the chewing action of the animal; and a pet toy product having a controlled intensity scent pleasing to the animal, said pet toy product being releasably attached to said receiving piece to provide olfactory and visual stimulation to the animal.

20. A pet toy, as claimed in claim 19, wherein said receiving piece includes:

a plurality of successive stacked layers defining said exterior sides.

* * * * *